United States Patent
Gemmati et al.

(10) Patent No.: US 8,196,857 B2
(45) Date of Patent: Jun. 12, 2012

(54) VARIABLE RATIO CRANK FOR A MANUAL FLIGHT CONTROL LINKAGE OF A ROTARY WING AIRCRAFT

(75) Inventors: Bernard Gemmati, Lauris (FR); Romuald Biest, Lambesc (FR); Carine Mirman, Sainte Croix de Quintillargues (FR)

(73) Assignee: Eurocopter, Marignane Cedex (FR)

( * ) Notice: Subject to any disclaimer, the term of this patent is extended or adjusted under 35 U.S.C. 154(b) by 245 days.

(21) Appl. No.: 12/791,216

(22) Filed: Jun. 1, 2010

(65) Prior Publication Data

US 2010/0308178 A1 Dec. 9, 2010

(30) Foreign Application Priority Data

Jun. 4, 2009 (FR) .................................. 09 02685

(51) Int. Cl.
*B64C 27/32* (2006.01)
(52) U.S. Cl. ...................... 244/17.25; 416/114; 416/112
(58) Field of Classification Search ............... 244/17.25, 244/7 A, 17.11, 39, 221; 416/114, 112, 113, 416/115, 147, 148, 127, 157 B
See application file for complete search history.

(56) References Cited

U.S. PATENT DOCUMENTS

| 3,168,265 | A | 2/1965 | Pfaff et al. |
| 3,218,874 | A | 11/1965 | Gerstenhauer |
| 3,589,331 | A | 6/1971 | Westervelt et al. |
| 3,799,695 | A | 3/1974 | Yamakawa |
| 4,047,838 | A * | 9/1977 | Ferris et al. ................... 416/115 |
| 5,163,815 | A * | 11/1992 | Fetters ........................... 416/164 |
| 5,826,822 | A * | 10/1998 | Rehm .......................... 244/17.25 |
| 5,853,145 | A * | 12/1998 | Carter, Jr. .................. 244/17.25 |
| 6,824,096 | B2 * | 11/2004 | Zoppitelli et al. ......... 244/17.25 |
| 7,585,153 | B1 * | 9/2009 | Schmaling et al. ........... 416/129 |
| 7,674,091 | B2 * | 3/2010 | Zierten .............................. 416/1 |
| 7,677,492 | B1 * | 3/2010 | Carter et al. ............... 244/17.11 |

FOREIGN PATENT DOCUMENTS

| EP | 1918196 A1 | 5/2008 |
| FR | 1132452 | 5/1955 |
| FR | 1132452 A | 5/1955 |
| FR | 2476013 | 8/1981 |
| FR | 2476013 A1 | 8/1981 |
| FR | 2916418 A1 | 11/2008 |

(Continued)

OTHER PUBLICATIONS

Search Report and Written Opinion; Application No. FR0902685; dated Feb. 3, 2010.

*Primary Examiner* — Christopher P Ellis
(74) *Attorney, Agent, or Firm* — Brooks Kushman P.C.

(57) ABSTRACT

The present invention relates to a bellcrank (40) for a flight-attitude-changing linkage (27, 25A, 28A) of the variable gain type. The linkage (27, 25A, 28A) connects a manual flight control device of a rotary wing aircraft (1), e.g. a hybrid helicopter, to at least one airfoil of said aircraft (1) suitable for causing a change in flight attitude. Said bellcrank (40) includes first and second sliders (50, 52). Said first slider (50) is connected to a movable portion (57, 61) of a setpoint flight-attitude-changing linkage (24) that delivers a setpoint, with movements of said linkage causing the gain of said variable-gain linkage (27, 25A, 28A) to be adjusted, which gain is proportional to the position of said movable portion (57, 61).

19 Claims, 7 Drawing Sheets

FOREIGN PATENT DOCUMENTS

| | | |
|---|---|---|
| FR | 2916419 A1 | 11/2008 |
| FR | 2916420 A1 | 11/2008 |
| GB | 613715 | 12/1948 |
| GB | 1180311 | 2/1970 |
| JP | 63210454 | 9/1988 |
| JP | 63210454 A | 9/1988 |

* cited by examiner

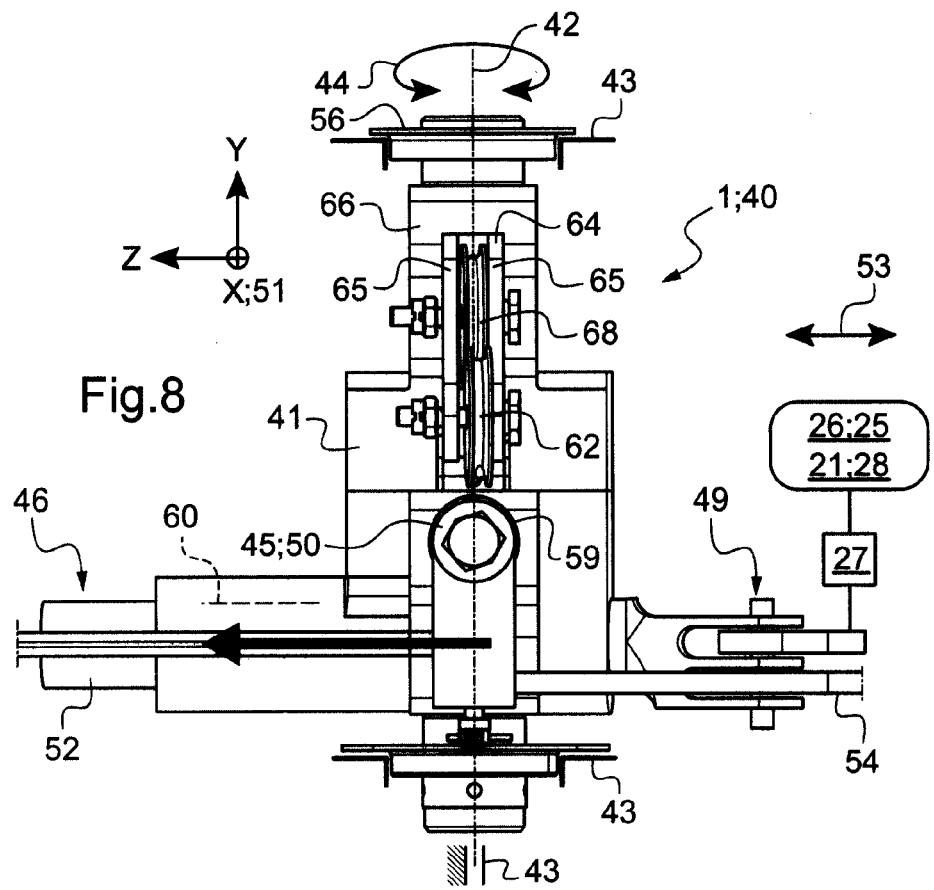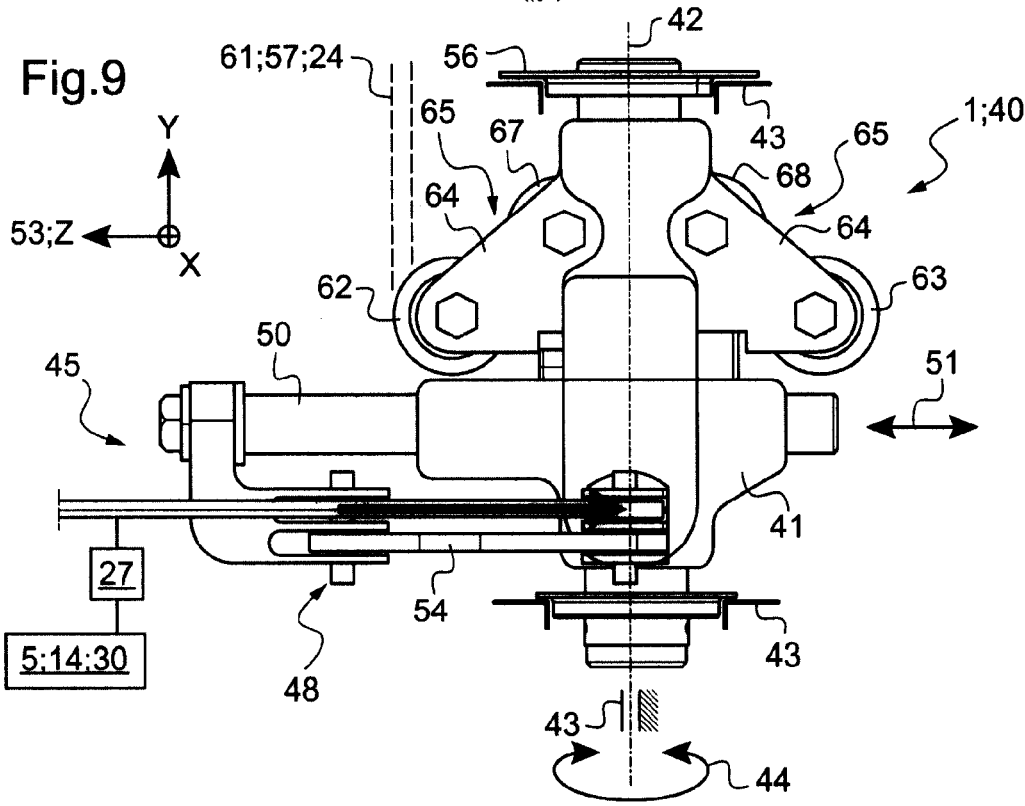

VARIABLE RATIO CRANK FOR A MANUAL FLIGHT CONTROL LINKAGE OF A ROTARY WING AIRCRAFT

CROSS REFERENCE TO RELATED APPLICATIONS

This application claims the benefit of FR 09 02685 filed Jun. 4, 2009. The disclosure of which is incorporated in its entirety by reference herein.

FIELD OF THE INVENTION

The present invention relates to a crank having a variable ratio transmission in a manual flight control that acts on a linkage suitable for giving rise to flight attitude changes in a rotary wing aircraft.

BACKGROUND OF THE INVENTION

Although not limited thereto, the invention is described in its applications to a helicopter of the hybrid type, e.g. as described in documents FR 2 916 418, FR 2 916 419, and FR 2 916 420.

That hybrid helicopter associates, at reasonable cost, the effectiveness in vertical flight of a conventional helicopter with high-speed performance in horizontal flight, e.g. up to a cruising air speed of about 400 kilometers per hour (km/h) or even more, and indeed also with a greater range.

For reasons of simplicity, the term "rotary wing" is used below to designate the lift rotor(s) of such an aircraft, and the term "rotor disk" is used to designate the geometrical surface defined by such a rotor.

Unlike a conventional helicopter, a hybrid helicopter has not only its rotary wing, but also a fixed wing that provides part of its lift in forward flight, with the lift it provides increasing with increasing air speed of the hybrid helicopter.

In order to increase the available thrust, a hybrid helicopter includes at least one propulsion arrangement, typically having at least one thrust propeller.

In addition, the thrust arrangements also provide a longitudinal stabilizing torque by being operated to deliver differential thrust. The hybrid helicopter thus has no need for an anti-torque rotor.

Furthermore, a hybrid helicopter is provided with a set of airfoils for stabilization and control purposes such as tail fins and control surfaces, in addition to the blades of the rotary wing and of the propulsion arrangements.

Another distinctive aspect of a hybrid helicopter is a proportional drive train with ratios that are constant in terms of speeds of rotation, which drive train connects together the rotary wing and the propulsion arrangements.

By modifying the pitch of the propeller blades of the propulsion arrangements collectively and by the same amount, it is possible to vary the advance thrust of the hybrid helicopter, which thrust is generated by said propulsion arrangements.

Because of the high air speeds that can be achieved by a hybrid helicopter, its airfoils for changing flight attitude are highly stressed, thus making it necessary to provide power assistance in order to enable them to be moved manually.

For this purpose, the aircraft is fitted with manual controls. The term "manual control" should not be interpreted strictly, but rather in contrast to automatic control that is actuated independently of the human action of the pilot. That is why, a rudder bar for controlling a change of attitude in yaw should be regarded as being a manual control in spite of the fact that it is actuated by a pedal unit.

Conventionally, power assistance to manual controls deprives pilots of tactile feedback (known as "haptic" feedback) that would otherwise enable them to sense the forces being applied to the airfoils that are to be moved, and thus making it possible to assess the consequences of a commanded action, and in particular whether such an action might endanger the aircraft.

Such a risk arises when the structural and/or functional limits concerning flight are reached while performing an operation for changing a flight attitude.

Thus, with power-assisted manual flight controls, it is sometimes necessary to be able to vary the gain of a manual control device such as a stick, a lever, or a rudder bar, for example.

Thus, for a given stroke applied as input to such a manual control device it is possible to obtain an output stroke that varies in proportion to some setpoint that is itself representative of a piloting parameter of the aircraft.

With a hybrid helicopter, air speed may reach values greater than 400 km/h, for example. A hybrid helicopter is thus subjected to an increased risk of exceeding its structural and/or flying limits, in the event of a manual flight control being operated too hard in the absence of any limit on its gain. One of the risks involved involves automatically taking a nose-up attitude.

Consequently, the narrow technical field of the invention is that of means for adjusting the gain of certain manual flight-attitude-changing controls of a helicopter in proportion to a piloting parameter of said helicopter.

The term "manual" flight control is used herein to cover various control devices under the authority of at least one pilot and suitable for modifying the flying attitude of a helicopter. This may be a control for acting on the cyclic pitch of the blades of a rotary wing, in pitching or in roll, generally applied using a so-called "cyclic stick". Such manual flight controls also include controls that act on the collective pitch (angle of attack) of the blades of a rotary wing, in general by using a lever known as a "collective pitch lever" or as a collective lever.

In a modern helicopter, such manual controls are located in the cockpit of the aircraft.

In this narrow technical field of means for obtaining proportional adaptation of the gain of manual flight controls, document FR 1 132 452 describes a flight control transmission mechanism for an airplane or an aerodyne, the mechanism having a ratio that is variable in proportion as a function of air speed so as to limit automatically the movements of control surfaces as the air speed increases. The mechanism is interposed between the control on which the pilot acts and the control surface that is to be moved. A servo-mechanism such as a hydraulic servo-control serves to actuate the control surface via a linkage including an adjustable pivot axis. The resistance to movement of the control is also increased proportionally as a function of Mach number.

Document FR 2 476 013 describes a flight control device for an airplane that presents characteristics that are different in fast flight and in slow flight. That device is interposed between a pilot control and a control member to apply transmission that is continuously adjustable as a function of a variable flight factor such as a dynamic pressure. That device includes a rocking lever having two arms hinged to links, or cables, and an abutment-adjusting member in the form of a projection that is moved further away or closer as a function of the value of the variable factor.

Document FR 2 916 420 describes a hybrid type helicopter. In addition to its rotary wing, that hybrid helicopter includes a fixed wing that provides a fraction of its lift in forward flight, which fraction increases with increasing air speed of the hybrid helicopter.

In order to increase the available thrust, a hybrid helicopter includes at least one propulsion arrangement, typically having at least one thrust propeller. In addition, the thrust arrangements also provide a longitudinal stabilizing torque by being operated to deliver differential thrust. Furthermore, a hybrid helicopter is provided with a set of airfoils for stabilization and control purposes such as tail fins and control surfaces, in addition to the blades of the rotary wing and of the propulsion arrangements. Because of the high air speeds that can be achieved by a hybrid helicopter, its airfoils for changing flight attitude are highly stressed, thus making it necessary to provide power assistance in order to enable them to be moved manually. For this purpose, the aircraft is fitted with manual controls.

Document GB 613 715 describes a rotary wing aircraft having a flight control system that is adjusted as a function of variations in flight of the power applied to thrusters.

Document GB 1 180 311 describes a lever mechanism for controlling two control surfaces in opposite directions, either on an aircraft or on a watercraft.

Document U.S. Pat. No. 3,168,265 describes a variable-ratio flight control device for an aircraft capable both of forward flight and of hovering, using levers that are connected via a hinge of angle that is adjustable as a function of the aircraft's true airspeed.

Document U.S. Pat. No. 3,218,874 describes a variable-ratio flight control system for an aircraft. The ratio varies from zero to a determined value within a mechanical flight control linkage, depending on a relative angular adjustment of two levers.

Mention may also be made of document EP 1 918 196 that describes a control stick system for an airliner with force-weighted response known as "haptic" feedback. The more the speed of the airplane increases, the greater the reaction for any given configuration of the stick and of the airfoils of the airplane. The airfoils are flaps hinged to the wings of the fixed wing of the airplane. Various factors having an influence on this reaction are taken into consideration, including the amount the stick is moved.

Outside the narrow technical field of flight controls, mention is also made of document JP 63 210 454 that describes a mechanical slider device that drives another slider via a link of constant length, the two respective slideways for the sliders being substantially perpendicular.

Although of interest, those prior art techniques are in practice poorly adapted to the very particular context of adjusting the gain of certain manual flight controls in a rotary wing aircraft, in particular a hybrid helicopter, in proportion to a piloting parameter.

Document U.S. Pat. No. 3,799,695 describes control devices for a helicopter. In control linkages, certain cranks are in the form of levers, each provided with a respective slot in which a finger can slide in order to vary the lever arm of said lever as a function of detections performed by an electronic device coupled to said crank, as a function of the flying speed of the helicopter.

Document U.S. Pat. No. 3,589,331 describes a control system for a rotary wing vehicle. Mechanisms work in parallel and in unison at low flying speeds and act differently at high speeds.

With those documents mentioned, it is easier to look in depth at the technical problems on which the invention is based, relying in particular on the example of the invention being applied to a modern rotary wing aircraft, e.g. a hybrid helicopter.

At forward speeds greater than those of a conventional rotary wing aircraft, it is particularly complex in practice to provide the functional balancing needed for optimizing the flight of such a hybrid helicopter.

Thus, it is common to find that downstream from an independent linkage for changing a given flight attitude directly in response to a corresponding manual control device, imposed flight or structural parameters of the aircraft give rise to changes of attitude other than the change requested via said linkage.

For example, an independent linkage for changing flight attitude in yaw, as actuated by the pilot using a control device such as a rudder bar, gives rise to changes of attitude that are combined with those actually being initiated by the pilot, e.g. in roll.

As mentioned above, in the absence of power assistance, the reaction forces on the airfoils give rise to tactile sensations (haptic feedback) representative of certain stresses to which the aircraft is subjected.

With power assistance of manual controls, the absence of tactile sensation representative of these reaction forces means that the pilot cannot perceive a risk of danger when the functional or structural limits of the aircraft are close or even exceeded.

Furthermore, it is found that the forces imposed on the airfoils of a modern helicopter are a function of its instantaneous flight conditions, and in particular of its load factor and its air speed.

The maximum load factor that can be accepted by an aircraft while turning or pulling up is proportional to said instantaneous air speed and also to its instantaneous angular velocity about the turning or pull-up axis. For example, the angular velocity in yaw of an aircraft is the rate at which it turns in one direction or the other about an axis extending in the elevation direction, when turning to left or to right.

In order to avoid exceeding a limiting load factor, a manual flight control is often provided with its own force relationship so as to indicate more clearly when such a limiting load factor is close.

If a manual flight control, e.g. for controlling yaw, is actuated at low frequencies, e.g. by slowly moving the corresponding control device, then the aircraft responds in a mode that is practically steady, i.e. without any variation in the corresponding attitude. As a result, the functional or structural limits of the aircraft are generally not reached. Conversely, if the same manual flight control is actuated at high frequency, i.e. by moving the control device quickly, then the fuselage, so to speak, does not have enough time to keep up.

Under such conditions, the functional or structural limits of the aircraft run the risk of being reached. Departures in one or more of said flight attitudes have a tendency to increase in significant manner and can lead to situations that are unacceptable, or indeed dangerous such as a tendency to take a nose-up attitude.

Clearly, those phenomena are more penalizing or even dangerous with increasing air speed of the aircraft.

In an attempt to avoid such situations in flight, the movements of certain control devices, in particular in yaw, need to have gain that is limited appropriately, in a manner that is proportional to a flight parameter that is representative of the corresponding risk.

In other words, it is desirable to vary the sensitivity of the flight-attitude-changing linkage controlled by a manual control, thereby reducing the pilot's authority over the airfoil situated at the end of said linkage on approaching a limiting value for a load factor.

Nevertheless, it is appropriate to ensure that such a variation in the sensitivity of the linkage does not give rise in interfering manner and by reversibility to modifications in the gains of certain constituent parts of said linkage.

Although various techniques have conventionally been used for varying the sensitivity of manual controls in this way, they are found not to be entirely satisfactory in practice, in particular for a fast rotary wing aircraft.

In order to reach the invention, particular testing has been performed. That testing has shown that within a given modern aircraft, optimizing the gain of the manual flight control device can be performed as a function of the instantaneous position of a manual flight control member that is distinct from the flight control device of gain that is to be adjusted. In particular, such a control member is one that acts on the air speed of the aircraft.

Furthermore, in order to increase the reliability of an aircraft, it has been found advantageous to minimize redundancies between an automatic electronic flight installation suitable for performing a given flight attitude change, e.g. an autopilot, and a control linkage acting on the same change of attitude.

Thus, in certain circumstances, it has been found undesirable for the optimization or adjustment of the gain of a given manual flight control device to depend directly on the electronic flight installation. Attempts have therefore been made to achieve said optimization within said linkage dedicated to the change of attitude in question in purely mechanical manner.

Nevertheless, those approaches do not rule out logical, electrical, and/or hydraulic processing for optimizing gain, damping, haptic feedback, and the like, acting on such and such a manual control device in a given helicopter.

In this context, it has been found that a bellcrank of the kind that is conventionally to be found in a flight-attitude-changing linkage, is a component that is suitable in certain applications for incorporating mechanical adjustment of the gain of a manual control device such as a rudder bar, a lever, a knob, or a stick.

It is common practice for one or more bellcranks to exist in a given flight-attitude-changing linkage of a modern aircraft. Conventionally, a bellcrank is operated by a manual control device such as a rudder bar when providing yaw control.

OBJECT AND SUMMARY OF THE INVENTION

The object of the invention is to propose a bellcrank of a novel type that makes it possible mechanically to adjust the gain of a manual flight control in a modern rotary wing aircraft, e.g. a hybrid helicopter, and that thus leads to piloting that is safer, more accurate, and more comfortable.

Because flying limits such as load factor are better complied with, the safety in flight of an aircraft incorporating such a bellcrank of the invention is thus improved. Another consequence of the invention relates to the longevity of the aircraft in question, which is increased because the components involved suffer less damage.

To this end, an object of the invention is to provide a bellcrank for a manual flight control device of a rotary wing aircraft that is to receive it.

Said bellcrank comprises at least a main body mounted to pivot about a pivot axis, said main body defining first and second radii diverging at a crank angle, said first radius having a first hinge at its outside end and said second radius having a second hinge at its outside end, the hinges being suitable for connecting the first and second radii respectively to first and second portions of a flight-attitude-changing linkage that actuates at least one airfoil.

According to the invention, said flight-attitude-changing linkage is of gain that is variable. For this purpose, said bellcrank includes a first slider suitable for being moved relative to the pivot axis in a first direction for adjusting the length of the first radius, while a second slider is suitable for being moved relative to the pivot axis in a second direction for adjusting the length of the second radius, said first slider including a connection finger close to the first hinge, the finger being for connection to a flight-attitude-changing linkage that acts as a setpoint and that is distinct from the flight-attitude-changing linkage of variable gain, said connection finger being movable between two extreme positions for minimum gain and for maximum gain.

In an embodiment, an interlink of fixed length connects the first slider to the second slider so that the variation in the gain of said flight-attitude-changing linkage is linear.

In an embodiment, each of said first and second hinges includes a pivot axis substantially parallel to said pivot axis of the crank, whereas close to the first hinge, for said connection of the setpoint flight-attitude-changing linkage to the flight-attitude-changing linkage of variable gain, said connection finger is rigidly fastened to said first slider and to a movable portion of the setpoint flight-attitude-changing linkage, such that the movements of said connection finger are parallel to said first radius between two extreme positions for maximum gain and for minimum gain.

In an embodiment, the movements of said connection finger between the two extreme positions act via the interlink respectively to adjust the lengths of the first radius and of the second radius, said setpoint flight-attitude-changing linkage being connected to a manual control member for controlling the thrust of the aircraft.

In an embodiment, the interlink is arranged within the bellcrank so that the length adjustment RP of the first radius and the length adjustment RD of the second radius are such that the ratio RD/RP (second radius adjustment over first radius adjustment) lies in the range 1 to 3 under conditions specified below.

It should be observed that in embodiments where the control-receiving input and the control-transmitting output are inverted in the crank, it is the ratio RP/RD of the first radius adjustment over the second radius adjustment that lies in the range 1 to 3.

In an embodiment, the first radius forms a crank angle relative to the second radius lying in the range 30° to 180°, and particularly in the range 45° to 90°, with the second slider being connected to the flight-attitude-changing linkage of variable gain via a pull rod extending substantially parallel to the first slider.

In an embodiment, the first and second sliders are of circular cross-section relative to their respective first and second radii, and guided in rectilinear movement in translation, each in a respective complementary housing in the main body.

In an embodiment, the first and second hinges and the hinges of the interlink are of the ball-joint and/or bearing type (i.e. a member having a single pivot axis).

In an embodiment, the first and second hinges serve to connect the bellcrank to a yaw flight-attitude-changing linkage of variable gain, and the manual control device dedicated to this change is a rudder bar, for example.

In an embodiment, the first and second hinges enable the bellcrank to be connected to a pitch flight-attitude-changing linkage of variable gain, and the manual control device is a cyclic pitch stick or lever, for example.

In an embodiment, the first and second hinges enable the bellcrank to be connected to a roll-attitude-changing linkage of variable gain, and the manual control device is a cyclic pitch stick or lever, for example.

In an embodiment, the first and second hinges enable the bellcrank to be connected to an altitude-attitude-changing linkage of variable gain, and the manual control device is a collective pitch lever, for example.

In an embodiment, the first and second portions of the flight-attitude-changing linkage are also connected respectively to the manual flight control device and to at least one airfoil.

In an embodiment, the first and second portions of the flight-attitude-changing linkage are also connected respectively to at least one airfoil and to the manual flight control device.

In an embodiment, the connection finger is secured to a movable portion in the form of an element for unidirectional transmission of the setpoint that is suitable for transmitting forces solely from the control member towards the control device, and not in the opposite direction.

In an embodiment, the connection finger is rigidly secured to a moving portion in the form of a transmission cable that extends locally between two guide pulleys substantially parallel to the first radius, the transmission cable forming part of the setpoint flight-attitude-changing linkage and being connected to a manual thrust control member.

In an embodiment, said guide pulleys are held between two holding walls extending substantially parallel to the pivot axis of the crank and to the first radius, these two holding walls also supporting two grooved wheels that are placed facing each other to guide the movable portion for transmitting the setpoint, and against which grooved wheels the movable portion bears locally under tension from screw-and-nut systems, e.g. in the form of turnbuckles.

In an embodiment, the transmission cable follows a loop between the two holding walls running from two inlet strands located upstream and extending substantially parallel and close together, and passing on the inside between two upper guide grooved wheels and then on the outside around two guide pulleys, between which pulleys it is secured to said connection finger.

The invention also provides a rotary wing aircraft fitted with at least one bellcrank as mentioned above.

The aircraft is a hybrid helicopter and the connection finger is connected to a setpoint flight-attitude-changing linkage that controls a differential advance thrust by adjusting the pitches of the blades of the propellers of at least two propulsion arrangements, one on the left and the other on the right of the aircraft.

In an embodiment, when changing the yaw flight attitude of the aircraft, the aircraft possesses a set of airfoils comprising substantially vertical fins, e.g. the set presents two vertical fins on either side of a horizontal stabilizer and at the outermost ends thereof, with a respective rudder control surface mounted to move on each of the vertical fins.

These operations may also result from differential thrust being exerted by the propellers of the propulsion arrangements.

Naturally, a bellcrank of the invention may also be used for controlling the cyclic pitch and/or the collective pitch of the blades of the lift rotor(s), or indeed for controlling airfoils that are dedicated to performing roll and/or pitch operations.

From the above, it can be understood that with an interlink interposed between the two sliders, the gain adjustments represented by changes in the length of the inlet (upstream) and outlet (downstream) radii take place on the principle of a deformable parallelogram, thereby ensuring proportionality for the transmission ratios between upstream and downstream in the flight-attitude-changing linkage, relative to the bellcrank.

BRIEF DESCRIPTION OF THE DRAWINGS

The invention and its advantages appear in greater detail in the following description of embodiments given by way of illustration and with reference to the accompanying figures:

in FIG. 4, a connection finger is towards its right-hand end-of-stroke position, and the adjustment ratio is close to 3, so that the pilot's authority is reduced to a minimum, i.e. the thrust is then at a maximum;

FIG. 8 is a transverse elevation view of the crank shown in FIGS. 6 and 7, with its first radius at maximum length;

FIG. 9 is a longitudinal and transverse plan view of the crank shown in FIGS. 6 to 8, still with its first radius at maximum length;

DETAILED DESCRIPTION OF THE PREFERRED EMBODIMENTS

The figures show three mutually orthogonal directions X, Y, and Z.

A "longitudinal" direction X corresponds to the lengths or main dimensions of the structures described. Thus, the forward thrust or the main component of the air speed on a level flight path is directed in this direction X.

In aviation, it is common for this direction X to designate generally the roll axis of the aircraft, when the aircraft is considered as a whole.

Another direction, Y, is said to be "transverse", and corresponds to the lateral widths or dimensions of the structures described. These longitudinal and transverse directions X and Y are sometimes said to be horizontal, by way of simplification. For example, the distance from the fuselage of a propulsion arrangement is generally measured along this direction Y.

In aviation, it is common for the direction Y generally to designate the pitch axis of the aircraft. It is also this direction Y that is used to define the terms "left" (while looking forwards, i.e. corresponding to the term "port") and "right" (corresponding to "starboard"), e.g. to distinguish between two half-wings or two propulsion arrangements.

Although this is merely an example of a non-limiting arrangement, in FIGS. 3 to 11, a bellcrank in accordance with the invention is shown as having its pivot axis extending in the direction Y.

A third direction Z is said to be an "elevation" direction and it corresponds to the height dimensions of the structures described: the terms "up" and "down" are used relative thereto. Sometimes this direction Z is said to be "vertical".

In aviation, the direction Z generally designates the yaw axis of an aircraft, when considered as a whole. For simplification purposes, it is considered that the axis of rotation of the main rotor of a rotary wing aircraft extends substantially in this direction Z.

Figure 1:
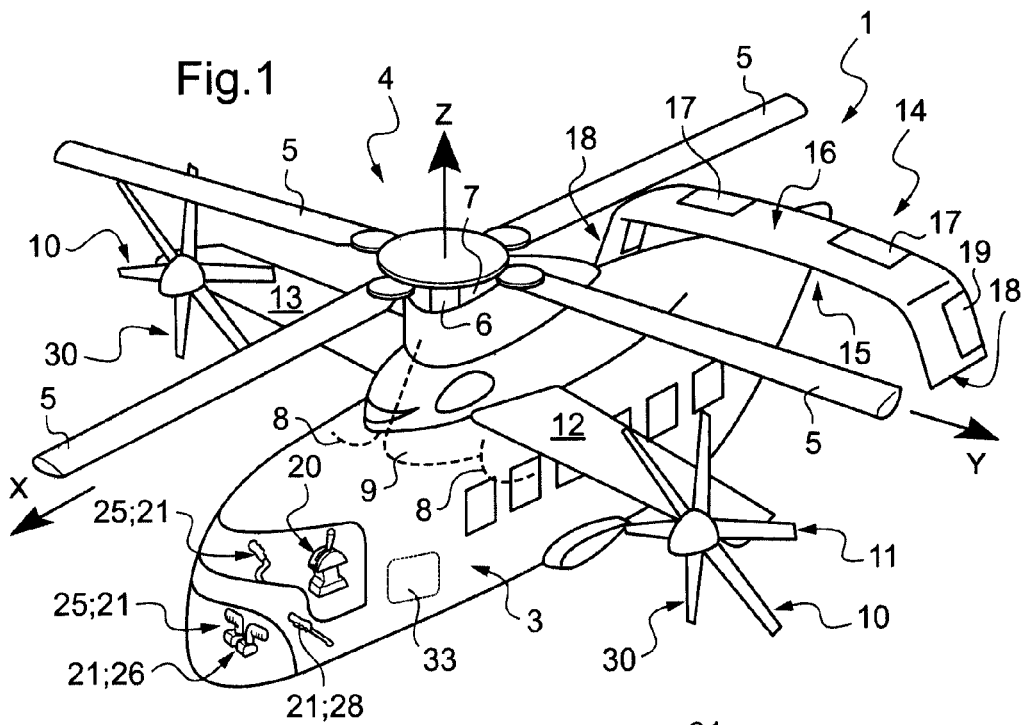
FIG. 1 is a diagrammatic perspective view of an example of a rotary wing aircraft, of the hybrid helicopter type, to which the invention applies.
Figure 2:
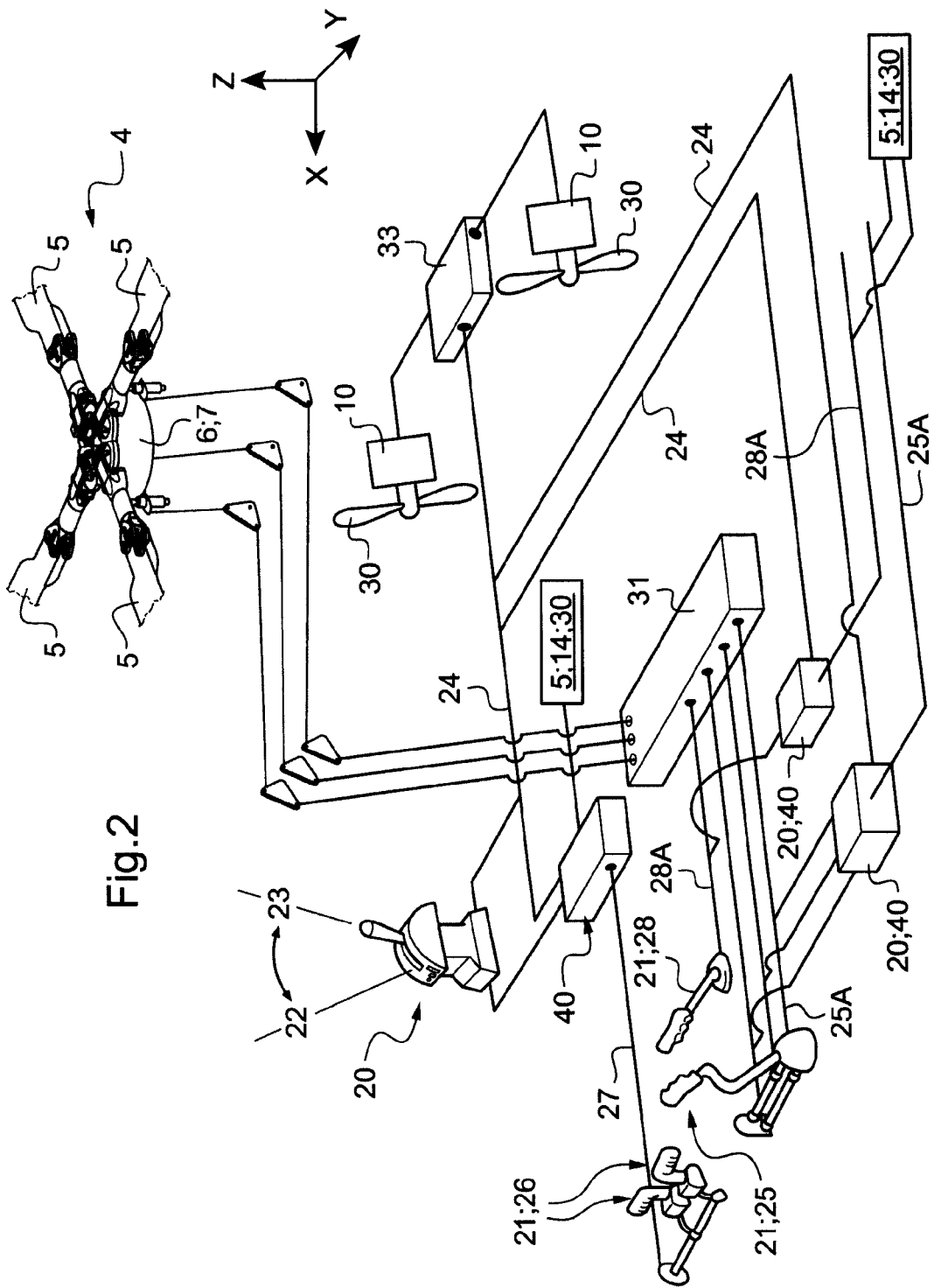
FIG. 2 is a highly diagrammatic and fragmentary view of the various linkages for changing flight attitudes that are controlled by manual control devices within a rotary wing aircraft such as that shown in FIG. 1.

Together the directions X and Y define a so-called "main" X,Y plane (linearly intersecting the plane of the sheet in FIG. 1) within which, for an aircraft 1 as shown in FIGS. 1 and 2, there is inscribed the lift polygon and a landing plane.

It is also recalled that it is conventional for a cyclic pitch control over the pitch of the blades of the main rotor of a rotary wing aircraft to act on the attitude of said aircraft about these two directions X and Y, respectively in rolling and in pitching.

It should be observed that in FIGS. 4 to 11, the directions X, Y, and Z are arbitrarily made to coincide with the general directions of a first radius, of a pivot axis, and of a second radius, respectively. This should not be considered as constituting any kind of limitation on the three-dimensional disposition within an aircraft of the components that are shown therein.

Figure 3:
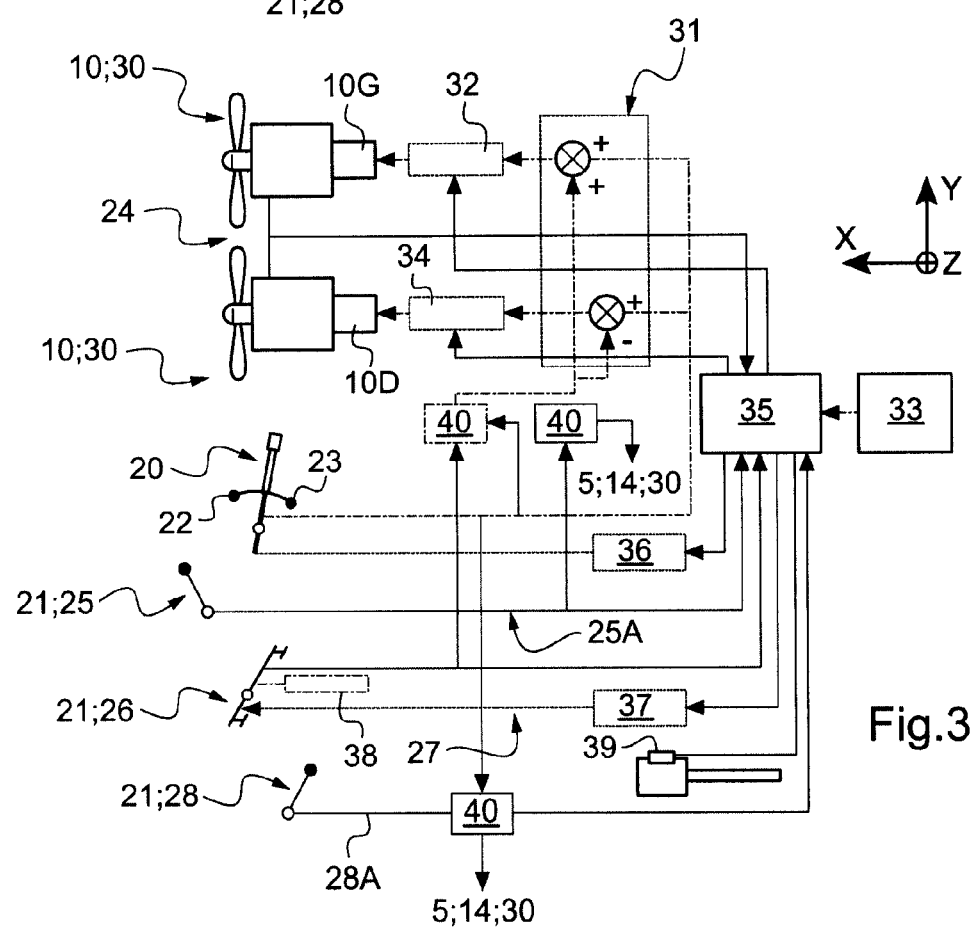
FIG. 3 is a fragmentary block diagram showing the logic of a hybrid helicopter in accordance with the invention, setting out the manual flight control means and differential thrust control means, in particular.

In FIGS. 1 to 3, reference 1 is an overall reference designating a modern rotary wing aircraft, which in this example is in the form of a hybrid helicopter.

The hybrid helicopter 1 has a fuselage 2 with a cockpit 3 at the front thereof.

A rotary wing 4, in this example in the form of a single main rotor, is designed to drive blades 5 in rotation. From FIG. 1, it can be understood that an axis of rotation of the main rotor 4, and thus of its drive mast, may be considered as being maintained generally permanently along the elevation direction Z, in spite of there being small-amplitude attitude adjustments of the blades 5, some of which are mentioned below.

From the above, it can be understood that numerical reference 5 designates, beyond the blades of the rotor 4, certain airfoils suitable for causing the attitude in flight of the aircraft 1 to be changed.

FIGS. 1 and 2 also show a swashplate arrangement 6 suitable for modifying the positions of pitch-change rods 7. These rods 7 act on the aerodynamic angle of attack of the blades 5 in a manner that is conventional in the field of helicopters, so as to change the roll and pitch attitude of the hybrid helicopter 1.

Such actions on the rotor 4 are not without influence on the risk of the hybrid helicopter 1 automatically taking a nose-up attitude, as mentioned above.

Furthermore, the hybrid helicopter 1 has a plurality of power plants 8 that, in this example, are in the form of two turbine engines spaced apart from each other transversely within the fuselage 2 on either side of the longitudinal plane of symmetry in elevation of the aircraft.

It should be observed that these two turbine engine power plants 8 respectively on the left (to the right in FIG. 1) and on the right (to the left in FIG. 1) can be seen only indirectly in FIG. 1 because of the presence of the fuselage 2.

In FIG. 1, numerical reference 9 designates a main gearbox (MGB) for transmitting power that is represented by dashed lines.

It is in particular via this main gearbox 9 that firstly both power plants 8 drive rotation of the rotary wing formed by the rotor 4.

Secondly, these power plants 8 also drive in rotation two propulsion arrangements 10 via said main gearbox 9.

In FIGS. 1 and 2, each propulsion arrangement 10 comprises a propeller having blades of pitch that is adjustable in order to modify the thrust for propelling the hybrid helicopter 1. These blades form aerodynamic surfaces 30. Consequently, these structures are referred to either as "propulsion arrangements" or as "propellers", and the same numerical reference 10 is used.

Each of the propulsion arrangements 10 on the left and on the right is mounted with an axis of rotation for its propeller that extends substantially along the longitudinal direction X on a side of the fuselage 2 that is opposite from the side occupied by the axis of the other propeller and propulsion arrangement 10.

It should be observed that each propulsion arrangement 10 has an axis that is substantially non-varying, i.e. it is of the non-tilting type, unlike a convertible aircraft such as a Bell Boeing V22 Osprey aircraft.

In the hybrid helicopter 1, the propellers or propulsion arrangements 10 may act together to produce yaw-stabilizing torque about an elevation axis extending substantially along the direction Z, since they can be caused to deliver differential thrust.

As a result, they serve not only to contribute to propelling the hybrid helicopter 1, but also to provide an anti-torque yaw-stabilizing function. The hybrid helicopter shown in FIG. 1 does not have a tail rotor, nor does it have contrarotating main rotors.

Furthermore, the hybrid helicopter of FIG. 1 has a transverse fixed wing 11 that contributes to providing the aircraft 1 with lift, in particular at high speed.

The fixed wing 11 is made up of two half-wings 12 and 13, one on the left and the other on the right. These half-wings 12 and 13 in the example shown in FIG. 1 are located at a high portion of the fuselage 2, substantially at the top thereof in elevation. The fixed wing 11 is therefore said to be a high wing.

It should also be observed that in the longitudinal direction X, the fixed wing 11 is substantially in register with the rotor 4 and beneath the disk thereof in the elevation direction Z. The propulsion arrangements or propellers 10 are disposed respectively on the half-wing 12 and on the half-wing 13.

Substantially at the same elevation height as the fixed wing 11, the hybrid helicopter 1 has a set of stabilization and control surfaces 14 located close to a rear portion 15.

This set 14 of stabilization and control surfaces is extends generally transversely and forms an upside-down U-shape. For changing pitch attitude, the set 14 presents a horizontal stabilizer 16 with two pitch control surfaces 17 that are movable relative to a stationary front portion of the horizontal stabilizer 16.

For maneuvers changing yaw attitude of the aircraft in flight, the set 14 of stabilization and control surfaces possesses in particular two substantially vertical tail fins 18, one at each end of the horizontal stabilizer 16, i.e. at the outer ends thereof. Each tail fin 18 has a rudder control surface 19 mounted to move thereon.

It is recalled that in embodiments of a hybrid helicopter 1, it is possible for the aerodynamic surfaces 30 of the propulsion arrangements 10 to contribute to yaw attitude changes in flight by appropriately modifying the thrust from the left and right propellers (FIG. 1).

In the examples shown, the set 14 of stabilization and control surfaces is not directly under the control of a dedicated flight control device, but is controlled by an automatic system as mentioned below.

To control the advance of the aircraft 1, i.e. its air speed, the pilot has available in particular a thrust control member, referenced 20. This control member 20 is sometimes referred to as a "thrust control lever" (TCL), by analogy with the manual thrust controls of airplanes, for example.

In FIGS. 1 to 3, this control member 20 is arranged in the cockpit 3 and serves in conventional manner to modify the mean pitch of the blades of the propellers of the propulsion arrangements 10 in order to control thrust.

Still with reference to these figures, there can be seen a cyclic pitch lever or stick 25. This cyclic pitch stick 25 is close to the first control member 20. The stick 25 forms part of the various flight manual control devices 21 that are made available within the cockpit 3 of the aircraft 1. Each manual flight control device 21 serves to control a particular change of flight attitude of the aircraft 1.

The term "manual flight control device" 21 is thus general, and it covers a plurality of structures, each dedicated to particular changes of the flight attitude of the aircraft 1, as described below.

The control device 21, e.g. in the form of a cyclic stick 25 acts on the changes of pitch attitude and on changes of roll attitude of the aircraft 1.

Juxtaposing these two types of control, i.e. the control member 20 acting on thrust and one or more control devices 21 suitable for giving rise to various changes in flight attitude, is unusual for a pilot of conventional modern helicopters. Adjusting forward thrust usually does not require a dedicated control member in conventional rotorcraft.

In a hybrid helicopter 1, the control member 20 acts identically on the pitch of the blades of each propeller of the propulsion arrangements 10, so as to obtain a collective variation of their pitches. For example, the pilot might require an increase from 3° to 6° in the pitch of both propellers 10, so as to increase the resultant longitudinal thrust as generated in particular by the propellers.

From FIG. 2, it can be understood that this thrust from the propellers of the propulsion arrangements 10 is adjustable by means of the control member 20 between two extreme positions 22 and 23. In other words, the movement of the control member 20 is limited between these two extreme positions 22 and 23.

The first extreme position 22 (sometimes written "100% TCL") when the control member 20 is fully forwards, is considered as corresponding to 100% of the thrust of the aircraft 1.

In contrast, the second extreme position 23 (also written "0% TCL"), when the control member 20 is fully rearwards, is considered as corresponding to 0% of the thrust of the aircraft 1. These percentages thus correspond respectively to a maximum value (position 22) and a zero value (position 23) of the resulting thrust.

It is explained below how, in a hybrid helicopter 1, the 0% position may nevertheless maintain a certain amount of differential thrust, in particular for performing the anti-torque function.

A force relationship is defined in proportion to an instantaneous position of said thrust control member 20 between its first and second extreme positions 22 and 23 (FIG. 2).

It can clearly be seen in FIGS. 2 and 3 that the thrust control member 20 is incorporated in a thrust flight-attitude-changing linkage 24, as can be seen in FIG. 2.

It should already be observed that in accordance with the invention, a proportional force relationship at an intermediate position between the minimum position 23 and the maximum position 22 of said thrust control member 20 is applied mechanically, as a gain-adjustment setting, to at least one of the flight controls controlled by one of the control devices 21 of the hybrid helicopter 1.

In FIGS. 2 and 3, there can be seen a pitch and roll flight-attitude-changing linkage 25A having its inlet connected to the control device 21 in the form of a cyclic stick 25. This pitch and roll flight-attitude-changing linkage 25A is incorporated in the hybrid helicopter 1 separately from the thrust flight-attitude-changing linkage 24.

This flight-attitude-changing linkage 25A thus conventionally connects said cyclic stick 25 forming one of the control devices 21 of the cockpit 3 to various airfoils, in particular the blades 5 of the rotary wing 4, that are suitable for giving rise to changes in the pitch and/or roll attitude of the aircraft 1.

Conventionally, longitudinal movements of the cyclic pitch stick 25 towards the front and/or the rear give rise to changes in pitch attitude of the aircraft 1, respectively nose-down or nose-up.

As for transverse movements of the pitch cyclic stick 25, to left and/or to right, they give rise to changes in the roll attitude of the aircraft 1, to the left and to the right, respectively.

Other airfoils (in particular in the set 14) may be involved in changes of attitude of the aircraft 1 in pitching and/or in roll, but without direct action on manual controls, i.e. in general under the authority of a computer-based flight assistance system.

The cockpit 3 includes another manual control device 21 referenced 26 that is suitable for producing changes in the yaw flight attitude of the aircraft 1.

In FIGS. 1 to 3, this device 21 is in the form of a rudder bar 26.

A flight-attitude-changing linkage 27 is dedicated to this yaw flight control device 21, as shown in association with the rudder bar 26 in FIGS. 2 and 3 in particular. This flight-attitude-changing linkage 27 serves to control the airfoils 30 of the blades of the propellers 10.

Other airfoils, in particular within the set 14, may also be involved in changes in the yaw attitude of the aircraft 1, but in general without direct intervention from manual controls, i.e. in general under the authority of a computer-based flight assistance system.

In FIGS. 1 and 2 there can also be seen another control device 21, here in the form of a collective pitch control lever 28 for controlling the collective pitch of the blades 5 of the rotary wing 4. As in a conventional helicopter, this collective pitch control lever 28 serves in particular to vary the lift generated by the main rotor 4 by increasing or reducing the pitch of all of its blades collectively.

For this purpose, this device 21 in the form of a collective pitch control lever 28 acts in particular via a flight-attitude-changing linkage 28A on the altitude control of the aircraft 1.

In particular in FIG. 2, this flight-attitude-changing linkage 28A acts firstly on a combiner 31. The combiner 31 acts secondly on the rotor 4, in particular as a function of piloting actions applied to the collective pitch control lever 28.

Furthermore, in FIG. 3 it can be seen that each of the flight-attitude-changing linkages 24 and 27 concerning thrust and yaw includes assistance, e.g. in the form of autopilot electric actuators given respective references 36 and 37. These actuators are commonly referred to as "trim" actuators.

A damper 38 can also be seen in FIG. 3. This damper 38 is connected via the linkage 27 to the rudder bar 26 for controlling changes in yaw attitude of the aircraft 1.

Other actuators 32 and 34 are provided within the thrust control linkage 24, as shown in FIG. 3. For each propulsion arrangement 10 there is provided a respective left and right pitch servo-control 10G or 10D. In addition, the pitch servo-control 10G of the left propeller 10 has its inlet coupled to a first pitch control actuator 32, while the right pitch servo-control 10D is coupled to a second pitch control actuator 34.

In other words, the thrust control linkage 24 includes, going from its manual control member 20 (TCL), a linkage having various relay links and hinges leading firstly to the assistance and secondly to the servo-controls (10G, 10D) and actuators (36; 32, 34) that enable the pitch of the blades to be controlled in each propeller-based thrust arrangement 10.

These pitch control actuators 32 and 34 are actuators connected in series.

In FIG. 3, the yaw flight control linkage 27 comprises, in a manner that is conventional for rotorcraft, and going from its manual flight control device 21 in the form of a rudder bar 26:

a linkage made up of various relay links, a bellcrank 40 that is described in greater detail below, and hinges leading to;

the assistance; and finally various airfoils that enable yaw flight attitude changes to be obtained for the aircraft 1, as described below.

Similar structures and arrangements can be seen for the pitch and roll control linkage 25A. For further details about the structure and the operation of conventional (non-hybrid) helicopter control equipment, reference may be made to document FR 2 864 028 that relates to a flight control enabling a pilot to put a single-engine rotorcraft into autorotation in the event of an engine breakdown.

The same applies for the control linkage 28A for controlling the collective pitch of the blades 5 of the rotor 4.

Before describing the operation of the invention proper, it is specified that the hybrid helicopter 1 is conventionally provided with an autopilot 33, shown symbolically in FIGS. 1 to 3.

FIG. 3 gives a block diagram showing the piloting control logic of a hybrid helicopter 1, showing the various manual flight control devices 21 and the control member 20 (TCL) for controlling collective thrust, in particular.

In FIG. 3, as is mentioned above, references 10G and 10D relate to servo-controls in the form of limited speed distributor valves, typically of hydraulic structure. Reference 31 designates a combiner that may also be a coupler.

Reference 35 designates a computer that applies the propeller pitch control relationships of the propulsion arrangements 10. It should be observed that the computer receives as inputs data representing the speed of rotation of the propellers of the propulsion arrangement 10, and also data representative of the instantaneous power from the power plants 8.

The autopilot referenced 33 integrates and transforms the information issued by and/or dedicated to the various flight controls.

Still with reference to FIG. 3, reference 39 designates a thrust adjusting pushbutton arranged on the cyclic stick 25. It constitutes more precisely a "Beep" control relative to the control member 20 or TCL for controlling the collective thrust of the propulsion arrangements 10 via the autopilot 33.

Finally, FIG. 3 serves to locate a crank 40 within the general architecture of the yaw control linkage 27.

The crank 40 is specific to the invention, and it is described in greater detail below, with reference to FIGS. 4 to 11, in particular.

For this purpose, there follows a description of the general operation of the flight-attitude-changing linkage 27 that acts on yaw.

For yaw attitude changes, the rudder bar 26 forms a dedicated control device 21. The pilot acts on the rudder bar 26 to obtain the flight attitude changes in yaw that the aircraft 1 is to perform.

The flight-attitude-changing linkage 27 is thus suitable for being actuated by the rudder bar 26 so as to act on the propellers of the propulsion arrangements 10, in particular.

This action takes place via a specific linkage, i.e. a linkage that is separate and distinct from the flight-attitude-changing control linkage 25A acting on roll and/or pitching, and also in a manner that is directly independent of the flight-attitude-changing linkage 24 that controls thrust.

Nevertheless, the state of the thrust flight-attitude-changing control linkage 24 produces a setpoint value that serves as a basis for setting, i.e. adjusting the gain of the yaw flight-attitude-changing linkage 27, as explained below. In this respect, the term "setpoint flight-attitude-changing linkage 24" is also sometimes used.

Most of the constituents of this yaw flight-attitude-changing linkage 27 are shown only diagrammatically.

It should also be observed that in spite of the independence of the pitch and roll flight-attitude-changing linkages, as is conventional for a rotary wing aircraft 1, any movement of the cyclic pitch 25 for imparting a pitch or a roll attitude change to the aircraft 1 can give rise indirectly to interactions on the roll or pitch attitude respectively, and vice versa.

Furthermore, it is recalled that any movement of the cyclic stick 25 enables the attitude of a rotary wing aircraft 1 to be changed simultaneously in pitch and in roll.

That said, the bellcrank 40 is described below in an application to a yaw control linkage 27.

The bellcrank 40 serves to adjust the sensitivity of the yaw control linkage 27, e.g. when it is preferable to increase or decrease the yaw authority of the pilot of the helicopter 1 at high speed. This sensitivity adjustment is also referred to as variable gain.

Said crank 40 is a relay arrangement for the manual flight control device 21 of the aircraft 1 with which it is associated, i.e. the rudder bar 26 in the example of FIGS. 1 to 3.

As can be seen clearly in FIGS. 6 to 11, the bellcrank 40 comprises a main body 41 mounted to pivot about a pivot axis 42. The body 41 is thus capable of pivoting about its axis 42, which is shown arbitrarily as being a substantially transverse axis (in the direction Y) in the examples shown.

This axis 42 lies at a fixed location relative to a reference base 43 (FIGS. 4-5 and 8-9) for the main body 41 and for the aircraft 1 receiving it. This base 43 is conventionally a structural or fuselage element of the aircraft 1.

In FIGS. 4 to 11, pivoting movements of the body 41 about its axis 42 (i.e. pivoting of the bellcrank 40 within the yaw control linkage 27) are represented by double-headed arrows 44.

Each movement direction of the body 41 along the arrow 44 corresponds to one actuation direction of the device 21 dedicated to yaw flight attitude changes, given reference 26, either to the left or to the right about a yaw control axis for the aircraft 1 that extends substantially along the elevation direction Z.

The way these pivoting movements 44 of the crank 40 act on the various airfoils 30 concerned is described in greater detail further below.

Within the crank 40, there are defined perpendicularly to the pivot axis 42, firstly a first radius 45 and secondly a second radius 46.

Conventionally, the first radius is one of the two lever arms of a pivoting bellcrank structure that is suitable for being moved as a function of a setpoint obtained from the thrust flight-attitude-changing linkage 24. In such a bellcrank structure, the second radius is the lever arm that is associated therewith.

Figure 4:
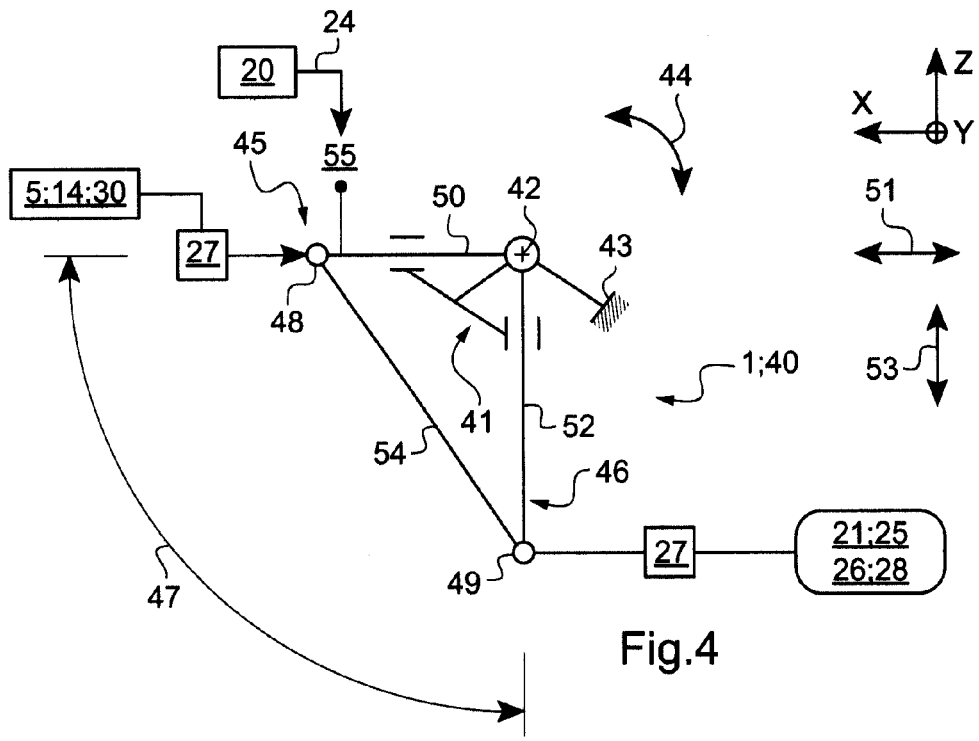
FIG. 4 is a diagrammatic view of a bellcrank of the invention, in a state in which its first radius is at its minimum length and its second radius is at its maximum length.
Figure 5:
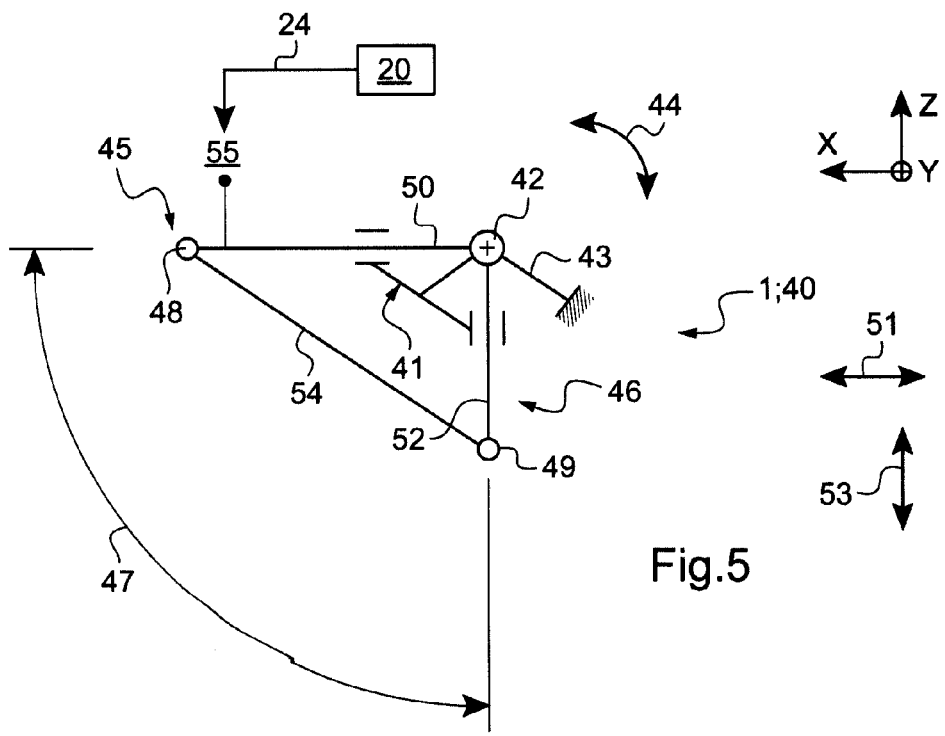
FIG. 5 is a view similar to FIG. 4 showing the crank of the invention with its connection finger at its left-hand end-of-stroke position, the adjustment ratio being close to one, so that the pilot's authority is increased to the maximum, i.e. the thrust is then at a minimum.
Figure 6:
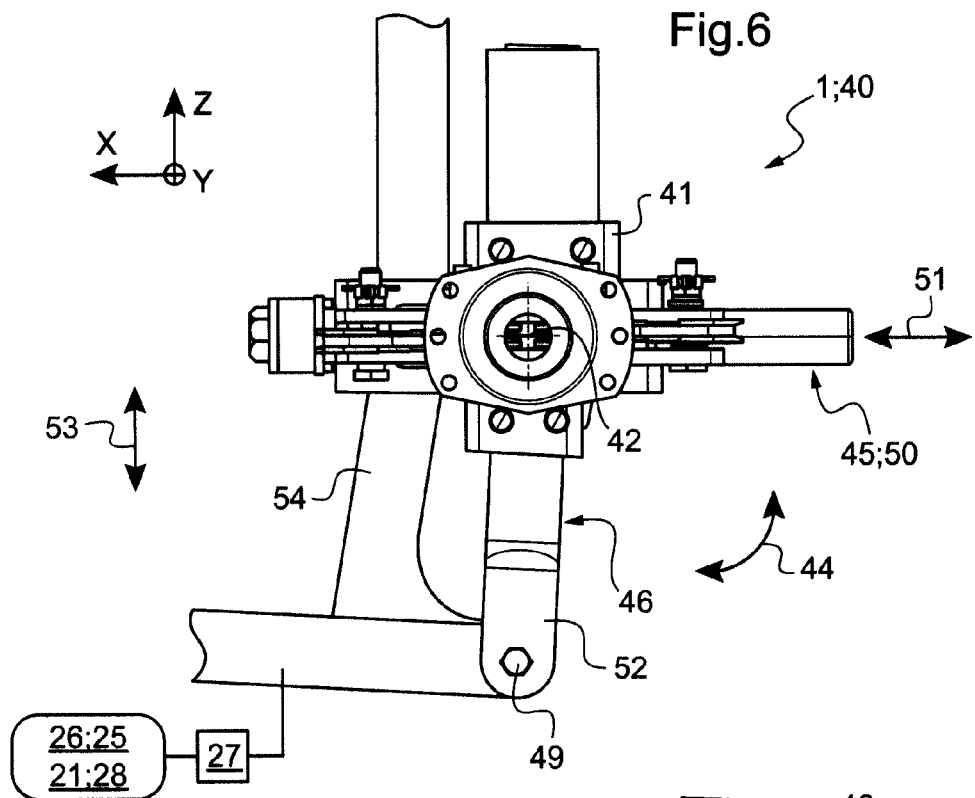
FIG. 6 is a longitudinal elevation view of a crank of the invention, seen looking along its pivot axis with a first radius at minimum length and a second radius at maximum length, as in FIG. 4.
Figure 7:
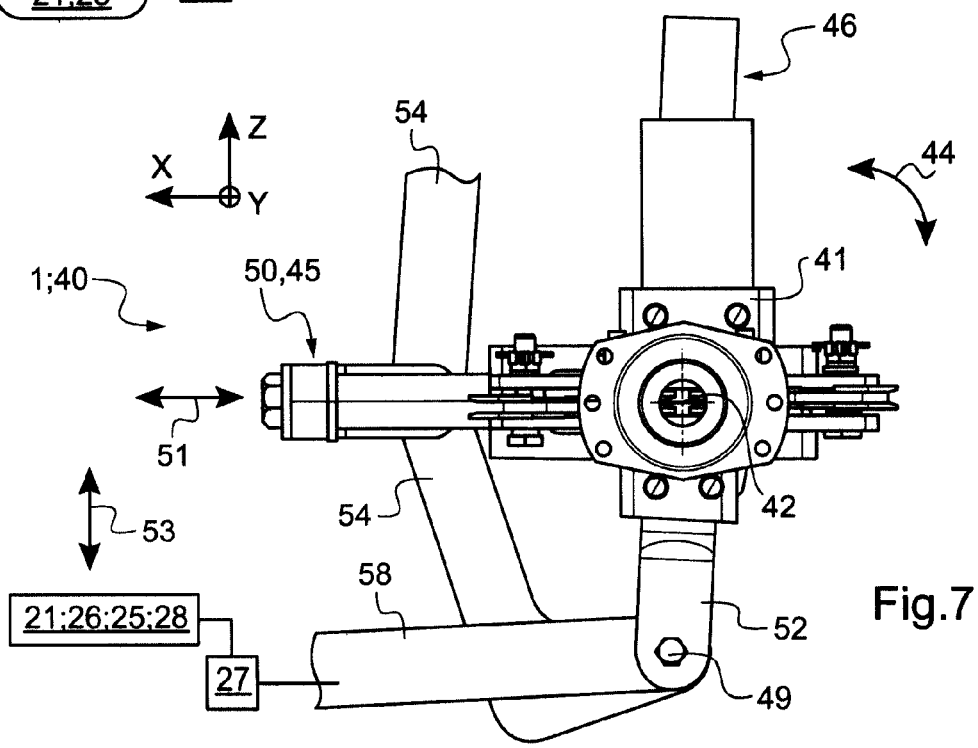
FIG. 7 is a view similar to FIG. 6, showing the same crank, with its first radius at maximum length and its second radius at minimum length, as in FIG. 5.

These radii 45 and 46 have respective orientations that diverge at a crank angle 47. In FIGS. 4 and 5, this angle is determined by the body 41 and is about 90°. This crank angle 47 depends essentially on the constraints of size and structure within the aircraft 1, and more particularly of the yaw control linkage 27.

In FIGS. 4 to 11, there can be seen a first hinge and a second hinge 49 of the bellcrank 40. These hinges 48 and 49 clearly form part of the yaw control linkage 27.

In the yaw control linkage 27, the first hinge 48 is downstream from the yaw control device 21 (the rudder bar in FIGS. 1 to 3) and upstream from the downstream portion of the bellcrank 40 and thus from the airfoils, in particular 5, 14, and 30, dedicated to this type of flight attitude change.

In FIGS. 4 and 5, the first hinge 48 is secured to the first radius 45, i.e. it is indirectly joined to the body 41.

It can be understood that the first hinge 48 of the body 41 is the hinge used for causing the crank to pivot 44 about the axis 42 under the effect of the pilot acting on the rudder bar 26.

In FIGS. 6 to 11, this first hinge 48 is in the form of a simple pivot bearing, and it receives as its control a rod that applies thrust in one direction or the other causing the crank to pivot 44.

In various embodiments of the invention, the hinge and/or the hinge 49 may be ball joints or journal bearings.

This first hinge 48 is arranged to connect the bellcrank 40 to a second portion of the yaw linkage 27 that actuates at least one airfoil 5, 14, 30.

It can be understood that said crank 40 is also connected to a first portion of the yaw linkage 27 that is actuated by the manual flight control device 21, 26.

In FIGS. 4 and 5, it can also be seen that it is within its second radius 46 that the bellcrank 40 presents said second hinge 49.

In general, the second hinge 49 is arranged to connect the bellcrank 40 to which it belongs to the first portion of said yaw linkage 27.

Typically, the second hinge 49 is similar to the first hinge 48 forming part of the first radius 45, and is in the form of a bearing connected to rodding.

In FIGS. 8 to 11, it can be seen that this first hinge 48 has a pivot axis (generally extending in the transverse direction Y in the example shown) that is thus substantially parallel to the pivot axis 42 of the main body 41.

The same applies to the second hinge 49.

According to the invention, the bellcrank 40 provides variable gain between the first radius 45 and the second radius 46, with the gain varying as a function of a setpoint value. In this example, this instantaneous setpoint value depends on the instantaneous thrust setting given by the control member 20 (TCL).

In the embodiments shown, it is modifications of the first radius 45 and of the second radius 46, away from and towards the pivot axis 42, that serve to provide the desired gain variation.

For this purpose, the bellcrank 40 has a first slider 50 that extends along the first radius 45, as shown in FIGS. 4 to 11.

In other words, the lengths of the first radius 45 and of the second radius 46 are variable so as to vary gain. In addition, the body 41 is movable about the pivot axis 42 for movement relaying purposes.

This variation in the length of the first radius 45 gives rise to variation in the length of the second radius 46. Under such conditions, the spacing of the hinges 48 and 49 relative to the pivot axis 42 is modified as a function of the instantaneous value of the above-mentioned setpoint.

The first slider 50 is suitable for being moved relative to the pivot axis 42 in a first direction 51 for adjusting the length of the first radius 45.

In FIGS. 4 to 11, this first adjustment direction 51 extends substantially along the longitudinal direction X (in the positions shown). Naturally, if the body 41 of the crank 40 pivots about the axis 42, then this first direction 51 moves angularly closer to or further from said longitudinal direction X.

The crank 40 is provided with a second slider 52 that is suitable for being moved relative to the pivot axis 42 in a second adjustment direction 53 for adjusting the length of the second radius 46. This second direction 53 is shown as extending substantially along the elevation direction Z in the corresponding figures.

In other words, the first slider 50 and the second slider 52 define respectively the spacings of the hinges 48 and 49 relative to the axis 42. These spacings are of dimensions that extend respectively along the longitudinal axis X and along the elevation direction Z in FIG. 4, and define firstly the length of the first radius 45 and secondly the length of the second radius 46.

Finally, in the examples shown, there can be seen an interlink 54. This interlink 54 connects the first slider 50 to the second slider 52. In FIGS. 6 to 11, it can be seen that the interlink 54 is connected to the first slider 50 and to the second slider 52 via simple anti-jamming pivot bearings.

With such an interlink 54, the variation in the gain of the yaw flight-attitude-changing linkage 27 is linear.

In FIGS. 4 to 11, the gain variation provided by the crank 40 is subjected to a dependency relationship between the radii 45 and 46.

In the examples, the interlink 54 has fixed spacing. Gain variation is based on the principle of the deformable parallelogram. In other words, a linear relationship causes adjustments in the length of the first radius 45 and of the second radius 46 to be combined geometrically in the first direction 51 and the second direction 52.

To perform this adjustment, the first slider 50 also has, close to the first hinge 48, a connection finger 55 (FIGS. 4-5 and 10-11). This connection finger 55 connects said first slider 50 to the thrust flight-attitude-changing linkage 24, where said linkage is used as a setpoint.

It can clearly be seen in FIGS. 4 and 5 in particular, that this connection finger 55 has its inlet connected to the thrust control member 20 and is thus incorporated in the thrust flight-attitude-changing linkage 24 so as to cause the length of the first radius 45 to vary in the first direction 51.

Naturally, these adjustments in the length of the first radius 45 can be oriented either way along the first direction 51. In other words, the first radius 45 can thus be lengthened or shortened, under the effect of the first slider 50 sliding one way or the other.

The same applies in the second direction 53 for adjusting the length of the second slider 52 and thus of the second radius 46.

Because of the connection provided by the interlink 54, for a stroke C45 applied at input of the first radius 45 along the direction 51 with an initial pivoting rate (44) of the crank 40 about its axis 42, the following values are obtained for the stroke C46 of the second radius 46 at the outlet from the crank 40:

$$C46 = C45/G54$$

and $$V52 = G54 \times V50$$

where G54 is the dependency ratio imparted by the interlink 54, which ratio may for example be linear. This value G54 is a variable representing the gain imparted by the bellcrank 40 for a given adjustment of the first radius 45 and thus of the second radius 46.

In another embodiment, provision is made for the interlink 54 to be arranged within the bellcrank 40 so that the adjustment RP in the length of the first radius and the adjustment RD in the length of the second radius 46 is such that the ratio (RD/RP) lies in the range 1 to 3 respectively for minimum relative gain at the extreme position 22 and maximum relative gain at the extreme position 23.

Furthermore, in the embodiment of FIG. 4, the connection finger 55 is towards the end of its rightward stroke, and the adjustment ratio is close to 3, so that the pilot's authority is reduced to a minimum, i.e. thrust is then at a maximum.

In FIG. 5, the crank 40 of the invention is shown with the connection finger 55 at the end of its leftward stroke, and the adjustment ratio is close to 1. As a result, the pilot's authority is increased to the maximum, i.e. thrust is then at a minimum.

It should be emphasized that the setpoint linkage 24 is distinct from the linkage 27 having variable gain.

In addition, the setpoint linkage 24 is adjustable between two extreme positions respectively of maximum gain and of minimum gain.

It can be seen, this corresponds to the thrust control member 20 with its first extreme position 22 (maximum thrust) and its second extreme position 23 (minimum thrust).

FIGS. 8 to 11 show that the main body 41 is mounted to pivot about the crank axis 42 by bearings 56 providing guidance in rotation, these bearings connecting the crank 40 to the base 43. For example, the bearings may be smooth bearings, ball bearings, or needle bearings.

Figures 10, 11:
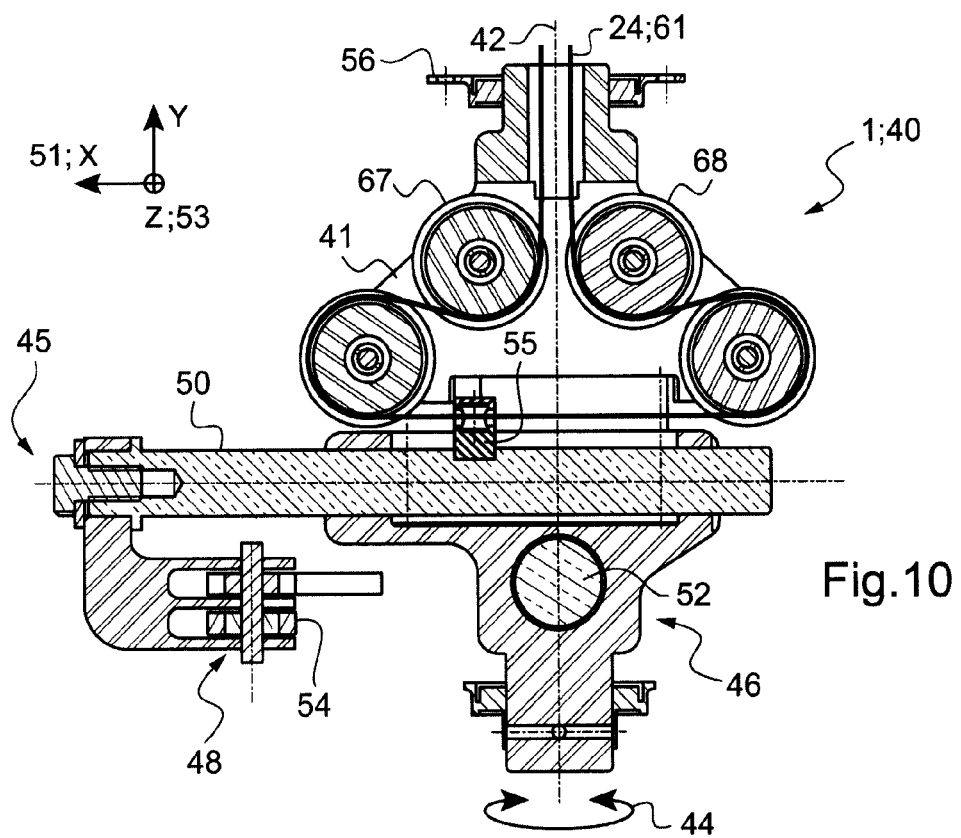
FIG. 10 is a section in a transverse elevation plane containing the pivot axis of the crank, showing how the bellcrank of the invention shown in FIGS. 6 to 9 is made, with its first radius at maximum length.
FIG. 11 is a view similar to FIG. 10, showing the various components making up the bellcrank of the invention as shown in FIGS. 6 to 10, and showing the travel of a transmission cable.

In FIG. 11 in particular, it can be seen that close to the first hinge 48, the first slider 50 has said connection finger 55 for connection to the setpoint linkage 24 in order to adjust the variable gain.

The connection finger 55 is rigidly fastened to the first slider 50 and also to a moving element or portion 57 of the setpoint linkage 24 (drawn in dashed lines in FIG. 9).

As a result, movements 51 parallel to the first radius 45 are performed between two extreme positions of maximum gain and of minimum gain.

One of these positions (maximum gain) is shown in FIG. 10, with the finger 55 in abutment to the left in the direction X against the body 41, the first radius 45 then being at its maximum length. In the minimum gain position, this finger 55 is in abutment to the right in the direction X against a longitudinally opposite surface of the body 41.

It can be understood that because of the connection between the thrust linkage 24 and the yaw linkage 27, the finger 55 is moved to its left abutment when the control member 20 (TCL) is in its minimum thrust position (23), while the finger 55 is taken to its right abutment when the member 20 is in its maximum thrust position (22).

The gain of the yaw linkage 27 is thus at a maximum when thrust is low and at a minimum when thrust is at its maximum.

It is thus possible making use of the lever arm principle and acting linearly via the interlink 54, to cause the length of the first radius 45 to be adjusted while also causing the length of the second radius 46 to be adjusted in proportion.

In FIGS. 10 and 11, the connection finger 55 is secured to a movable element 57 for transmitting the setpoint, which element is unidirectional or irreversible.

In other words, the irreversible movable element 57 is capable only of transmitting forces from the control member 20 to the appropriate control device 21, and is not capable of transmitting forces in the opposite direction, i.e. from the control device 21 to the control member 20.

As a result, the bellcrank 40 should also be considered as being irreversible, in the sense that it prevents movements of the airfoils (5, 14, 30) and/or of the control device 21 being able to modify the setting of the control member 20 acting on thrust (i.e. its position between its extreme positions 22 and 23).

As mentioned above, the setpoint is linear because of the non-deformable connection between the hinges 48 and 49 as embodied in FIGS. 4 to 11 by the interlink 54.

In certain embodiments, the interlink 54 is arranged within the bellcrank 40 so that the length adjustment RP of the first radius 45 and the length adjustment RD of the second radius 46 are such that the ratio RD/RP lies in the range 1 to 3 respectively for maximum relative gain at the extreme position 23 and minimum relative gain at the extreme position 22.

It should be recalled that the first radius 45 and the second radius 46 are measured from the crank axis 42 respectively to the first hinge 48 and to the second hinge 49.

In the embodiments shown, the crank angle 47 is of the order of 90°. In general, this crank angle 47 lies in the range 30° to 180°.

In the embodiment of FIGS. 6 to 11, the second slider 52 is connected to the second portion of the variable-gain linkage 27 by a pull rod 58 (FIG. 7) extending substantially parallel to the first slider 50. The commands applied to the crank 40 act substantially along directions that are mutually perpendicular and that are close to each other between the first and second radii 45 and 46.

FIGS. 8 and 11 show embodiments of the sliders 50 and 52 that are of circular cross-section relative to the corresponding first radius 45 or second radius 46.

These sliders 50 and 52 are also guided in rectilinear movement in translation in the main body 41, each in a complementary housing 59 or 60. I.e. the sliders 50 and 52 are mounted to slide along their respective radii 45 and 46 relative to the body 41.

It should be observed in FIGS. 8 to 11 that the hinges 48 and 49 and the hinges of the interlink 54 are ball joints.

These hinges 48 and 49 are connected to pull rods extending respectively towards the yaw control device 21 in association with the first portion of the linkage 27, and towards the airfoils 5, 14, and 30 that are suitable for implementing the changes, in association with the second portion of said linkage 27.

In these embodiments, said hinges 48 and 49 serve to connect the bellcrank 40 to the variable-gain linkage 27 for manual flight control in yaw.

In an embodiment that is not shown, similar hinges serve to connect the crank 40 to another linkage 25A, a variable-gain linkage, e.g. for manual flight control in pitching and/or roll.

Under such circumstances, the manual control device 21 is typically a cyclic stick 25. It can clearly be seen in FIG. 11 that the connection finger 55 is rigidly secured to a movable element 57 in the form of a transmission cable 61, the element being unidirectional.

The transmission cable 61 extends locally between two guide pulleys referenced 62 and 63 that are held between two support walls or cheekplates 64 and 65 of the body 41.

Each pulley 62 or 63 has a groove that is complementary to the cable 61 and is mounted loose on a stationary pivot pin extending substantially in the elevation direction Z.

Each cheekplate 64 or 65 receives one of the ends of the pivot pins of the pulleys 62 and 63. In FIGS. 8 and 9, it can clearly be seen that these cheekplates 64 and 65 are in fact constituted by two tabs, each being releasably assembled on a central portion 66 of the body 41.

It should be observed that the cheekplates 64 and 65 extend substantially parallel to the first radius 45 and to the pivot axis 42.

In these embodiments, going from top to bottom, the crank 40 presents a pivot guide bearing 56, its central portion 66 with the cheekplates 64 and 65, the housing 59 for receiving the first slider 50, the housing 60 for receiving the second slider 52, the various hinges, rods, and links, and then another pivot guide bearing 56.

It can be understood that the transmission cable 61 forms part of the setpoint linkage 24 since it is shown connected upstream to the manual thrust control member 20 (TCL). The function of the pulleys 62 and 63 is to guide the cable 61. The spacing between them is fixed during normal operation of the crank 40. However this spacing may be adjusted, e.g. for maintenance.

The tension in the transmission cable 61 is provided by screw-and-nut systems, e.g. of the turnbuckle type.

It should be observed in FIG. 10 or 11 that the two cheekplates 64 and 65 also carry two grooved wheels 67 and 68. These wheels 67 and 68 are arranged with their axes fixed parallel to the axes of the pulleys 62 and 63 but offset within the body 41, both upwards and inwards. These axes are thus located as a trapezium on a longitudinal base with sides extending upwards and inwards relative to the body 41.

These grooved wheels 67 and 68 serve to guide the cable 61, which thus occupies an upside-down T-shape with rounded corners in the plane of FIG. 11, the cable passing, near the bottoms of the cheekplates 64 and 65, around the pulleys 62 and 63 (through substantially half a turn) and then towards the tops of the cheekplates 64 and 65, pressing outwards against the wheels 67 and 68 (over substantially one-fourth of a turn).

Said crank 40 is thus arranged in such a manner that said transmission cable 61 follows a loop between the two cheekplates 64 and 65 that serve to hold the pulleys 62 and 63 and the grooved wheels 67 and 68. This upside-down T-shape loop stems from two strands 69 and 70 of the cable 61.

These strands 69 and 70 constitute the portions of the cable 61 that penetrate into the body 41. Upstream, these strands 69 and 70 are substantially parallel and close together, i.e. they extend substantially in the transverse direction Y, side by side.

The strands 69 and 70 then extend (downwards) internally between the two wheels 67 and 68 (with facing grooves), which wheels may be referred to as upper wheels.

Thereafter, the strands 69 and 70 extend outwards around the two tensioning pulleys 62 and 63 between which said connection finger 55 is anchored. For this purpose, the finger 55 possesses a cable clamp that is suitable for clamping on and holding a longitudinal segment of the cable 61 between the pulleys 62 and 63, that may be referred to as bottom pulleys.

In the bellcrank 40 of the invention, the connection finger 55 is thus connected to the setpoint linkage 24 that controls the differential forward thrust, in particular by setting the pitches of the propeller blades in the two propulsion arrangements 10.

As mentioned above, conventional helicopters are fitted with constant gain feedback dampers, in particular because of their relatively slow forward speed compared with the forward speed of a rotary wing hybrid aircraft 1. Conventionally, such dampers are connected to the roll, pitch, and yaw controls.

It can be understood from the above, that in contrast, by virtue of the crank 40, the invention makes it possible to adapt the gain of a flight-attitude-changing control linkage in a manner that is effective, reliable, and simple.

To summarize, it can be understood that the variable ratio crank 40 of the invention serves to solve the problems raised by conventional fixed-gain flight controls when used in a high-speed helicopter 1.

Thus, the variable bellcrank 40 of the invention allows gain to be varied mechanically while preserving the possibility of assisted and/or automatic action being taken on the airfoils (5, 14, and 30).

By means of the invention, the same piloting stroke at the inlet of the device 21 (e.g. for controlling yaw by means of a rudder bar 26) gives rise to an outlet stroke that is variable.

In this way, it is practical to vary the sensitivity of the flight control linkage 27, e.g. when it is appropriate to increase or decrease the yaw authority of the pilot of a high-speed helicopter 1.

With sensitivity adjusted to circumstances, the invention also serves to avoid the control device 21 (e.g. the yaw control device) acting reversibly on the control member 20 and modifying the gain of said member 20.

In other words, with the invention, the control member 20 remains independent of and insensitive to any action on said device 21 of gain that is adjusted depending on the setpoint delivered by the member 20.

In variants that are not shown, gain is varied by modifying the length of at least one of the two lever arms (or radii 45 and 46) of the crank 40 simultaneously and as a function of the setpoint value.

In one of such variant, only one of the two arms is subjected to variation in length, depending on the applied setpoint value.

Naturally, the present invention may be subjected to numerous variations as to its implementation.

Figure 12:
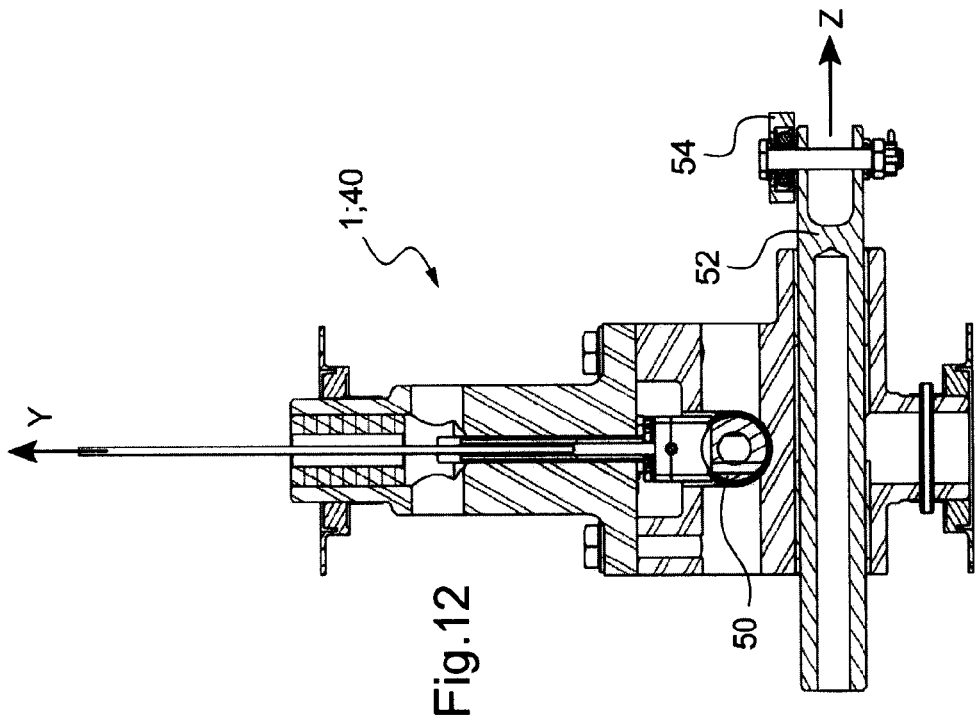
FIG. 12 is a view of a presently preferred embodiment of a crank of the invention, in section in a transverse elevation plane, with an outlet slider in its bottom position, connected to an interlink by a member constituting a simple pivot bearing, and an inlet slider in its high position.

Thus, FIG. 12 shows an embodiment of the crank 40 that possesses an outlet slider 52 in the bottom position (relative to the direction Y) that is connected to the interlink 54 by a hinge 49 in the form of a simple pivot bearing. In this figure, the inlet slider 50 is in the high position.

Figure 13:
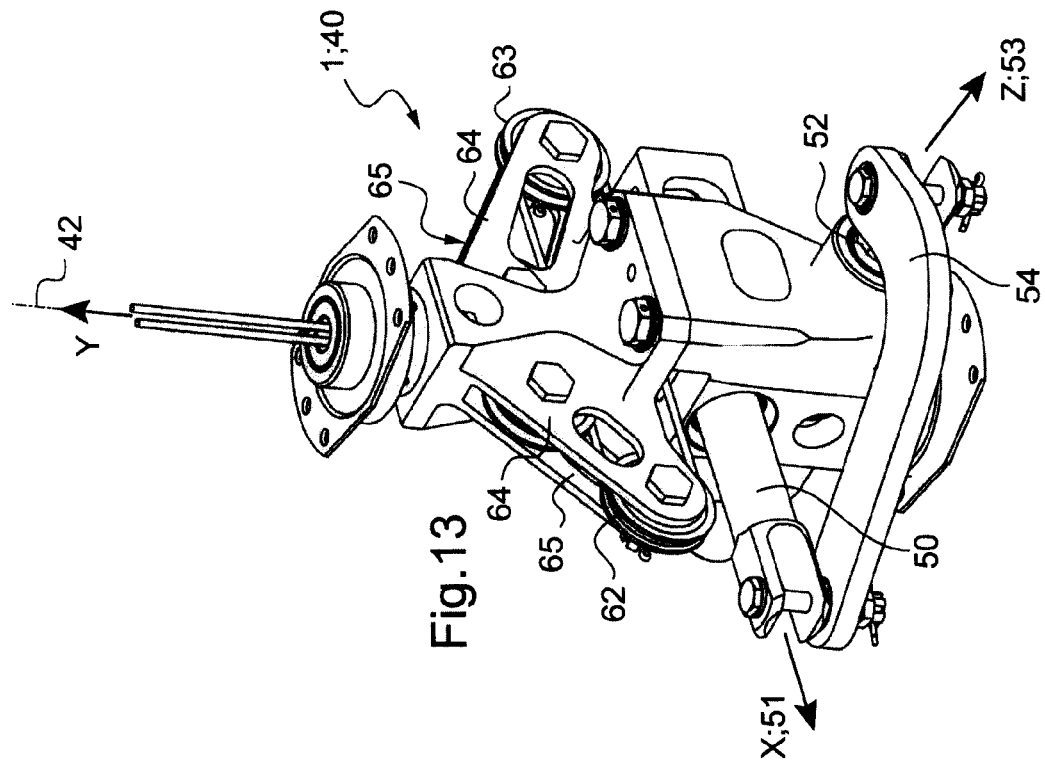
FIG. 13 is an isometric view from above and from the inlet side, in which the crank is asymmetrical in a longitudinal plane since two guide pulleys are at different distances from the axis of the outlet slider, the arm carrying the guide pulley that is closer to the hinge connecting the inlet slider to the interlink being shorter than the opposite arm.

FIG. 13 shows clearly that the crank 40 is asymmetrical in shape. This can be seen clearly in the plane defined by the directions X and Y in which the two guide pulleys 62 and 63 are each at a different position along the direction X relative to the axis 42 about which the crank 40 pivots (44).

Thus, on the left, the guide pulley 62 that is above the hinge between the slider 50 (here the outlet slider) and the interlink 54 is mounted on a pair of short cheekplates 64 and 65. In other words, these short cheekplates 64 and 65 are closer to the pivot axis 42 of the crank 40 than the other pair of cheekplates 64 and 65 that are said to be "long" that supports the other guide pulley 63 on the opposite side in the direction X.

In the FIGS. 12 and 13, the hinges 48 and 49 connecting the interlink 54 are in the form of simple rotary bearings, having axes that are substantially parallel to the direction Y. In surprising manner, such a configuration using simple bearings enhances gentle transmission of inlets and outlets using the interlink 54 and avoids jamming, compared with embodiments in which the hinges of the interlink 54 are implemented as ball joints, in particular.

Nevertheless, certain embodiments provide for all of the hinges to be ball joints, whether the hinges with the interlink 54 or the hinges connecting the sliders 50 and 52 to the inlet and outlet linkages.

Although several embodiments are described above, it will readily be understood that it is not conceivable to identify exhaustively all possible embodiments. Naturally it is possible to envisage replacing any of the means described by equivalent means without going beyond the ambit of the present invention.

Although the invention is described for a variable gain bellcrank incorporated in a yaw flight-attitude-changing linkage, it is clear that it could equally well be incorporated in other linkages, in particular those for controlling pitching and/or roll 25A, or indeed the linkage 28A for controlling the collective pitch of the blades 5 of the main rotor 4.

Under such circumstances, the attitude changing linkage in which the crank of the invention is incorporated may be involved with one or more groups of airfoils. For example, such a bellcrank of the invention may act on at least one rotary wing and/or at least one thrust arrangement and/or at least one set of airfoils such as that referenced 14 in FIG. 1.

Furthermore, it is important to observe that the first and second portions of the flight-attitude-changing linkage 27, 25A, 28A may be respectively connected, according to requirements:

to the manual flight control device 21, 25, 26, or 28; and
to at least one airfoil 5, 14, 30; or vice versa.

What is claimed is:

1. A bellcrank for a manual flight control device dedicated to making a selected flight attitude change in a rotary wing aircraft receiving it, said bellcrank comprising at least a main body mounted to pivot about a pivot axis, said main body defining perpendicularly to said axis both a first radius and a second radius that diverge from each other at a crank angle; said first radius having a first hinge at its outside end and said second radius having a second hinge at its outside end, the hinges being suitable for connecting the first and second radii respectively to first and second portions of a flight-attitude-changing linkage that actuates at least one airfoil of the aircraft receiving the crank, wherein said flight-attitude-changing linkage is of gain that is variable, and wherein, for this purpose, said bellcrank includes a first slider suitable for being moved relative to the pivot axis in a first direction for adjusting the length of the first radius, while a second slider is suitable for being moved relative to the pivot axis in a second direction for adjusting the length of the second radius, said first slider including a connection finger close to the inlet movement hinge, the finger being for connection to a setpoint flight-attitude-changing linkage that is distinct from the variable-gain linkage, said finger) being movable between two extreme positions for minimum gain and for maximum gain.

2. A bellcrank according to claim 1, wherein the first and second portions of the flight-attitude-changing linkage are also connected respectively to the manual flight control device and to at least one airfoil.

3. A bellcrank according to claim 1, wherein the first and second portions of the flight-attitude-changing linkage are also connected respectively to at least one airfoil and to the manual flight control device.

4. A bellcrank according to claim 1, wherein an interlink of fixed length connects the first slider to the second slider so that the variation in the gain of said flight-attitude-changing linkage is linear.

5. A bellcrank according to claim 1, wherein each of said first and second hinges includes a pivot axis substantially parallel to said pivot axis of the crank, whereas close to the first hinge, for said connection of the setpoint linkage to the variable-gain linkage, said connection finger is rigidly fastened to said first slider and to a movable element of the setpoint linkage, such that the movements of said finger are parallel to said first radius between two extreme positions of minimum gain and of maximum gain.

6. A bellcrank according to claim 4, wherein the movements of said connection finger between the two extreme positions act via the interlink respectively to adjust the lengths of the first radius and of the second radius, said setpoint linkage being connected to a manual control member for controlling the thrust of the aircraft.

7. A bellcrank according to claim 4, wherein the interlink is arranged within the bellcrank so that the length adjustment RP of the first radius and the length adjustment RD of the second radius are such that the ratio RD/RP lies in the range 1 to 3 respectively for a minimum relative gain in the extreme position and for a maximum relative gain in the extreme position.

8. A bellcrank according to claim 1, wherein the first radius forms a crank angle relative to the second radius lying in the range 30° to 180°, and particularly in the range 45° to 90°, with the second slider being connected to the variable-gain linkage via a pull rod extending substantially parallel to the first slider.

9. A bellcrank according to claim 1, wherein the first and second sliders are of circular cross-section relative to their respective radii, the sliders being guided in rectilinear movement in translation, each in a respective complementary housing in the main body.

10. A bellcrank according to claim 4, wherein the first and second hinges and the hinges of the interlink are ball joints and/or bearings.

11. A bellcrank according to claim 1, wherein the first and second hinges serve to connect said crank to a yaw flight-attitude-changing linkage that is of variable gain, and the manual control device is a rudder bar.

12. A bellcrank according to claim 1, wherein the first and second hinges enable said crank to be connected to a pitch flight-attitude-changing linkage of the variable gain type, and the manual control device is a cyclic pitch stick.

13. A bellcrank according to claim 1, wherein the first and second hinges enable said crank to be connected to a roll flight-attitude-changing linkage of the variable gain type, and the manual control device is a cyclic pitch stick.

14. A bellcrank according to claim 1, wherein the first and second hinges enable said crank to be connected to an altitude flight-attitude-changing linkage of the variable gain type, and the manual control device is a collective pitch lever.

15. A bellcrank according to claim 1, wherein the connection finger is secured to a movable element in the form of an element for unidirectional transmission of the setpoint that is suitable for transmitting forces solely from the control member towards the control device.

16. A bellcrank according to claim 1, wherein the connection finger is rigidly secured to a moving portion in the form of a transmission cable that extends locally between two guide pulleys substantially parallel to the first radius, the transmission cable forming part of the setpoint linkage and being connected to a manual thrust control member.

17. A bellcrank according to claim 16, wherein said guide pulleys are held between two holding walls extending substantially parallel to the pivot axis of the crank and to the first radius, these two holding walls also supporting two grooved wheels that are placed facing each other to guide the movable portion for transmitting the setpoint, and against which the movable portion bears.

18. A bellcrank according to claim 16, wherein the transmission cable follows a loop between the two holding walls running from two inlet strands located upstream and extending substantially parallel and close together, and passing on the inside between two upper grooved wheels and then on the outside around two guide pulleys, between which it is secured to said connection finger.

19. A rotary wing aircraft fitted with at least one bellcrank according to claim 1, wherein the aircraft is a hybrid helicopter, the connection finger being connected to a setpoint flight-attitude-changing linkage that controls a differential advance thrust by adjusting the pitches of the blades of the propellers of at least two propulsion arrangements, one on the left and the other on the right of the aircraft.

\* \* \* \* \*